United States Patent
Komatsu

(10) Patent No.: US 11,561,644 B2
(45) Date of Patent: Jan. 24, 2023

(54) DISPLAY SYSTEM AND CONTROL METHOD

(71) Applicant: Panasonic Intellectual Property Management Co., Ltd., Osaka (JP)

(72) Inventor: Natsuki Komatsu, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/478,012

(22) Filed: Sep. 17, 2021

(65) Prior Publication Data

US 2022/0004302 A1 Jan. 6, 2022

Related U.S. Application Data

(63) Continuation of application No. PCT/JP2020/006974, filed on Feb. 21, 2020.

(30) Foreign Application Priority Data

Mar. 20, 2019 (JP) .............. JP2019-053503
Mar. 20, 2019 (JP) .............. JP2019-053505

(51) Int. Cl.
*G06F 3/041* (2006.01)
*G06F 3/044* (2006.01)

(52) U.S. Cl.
CPC ...... *G06F 3/04164* (2019.05); *G06F 3/04182* (2019.05); *G06F 3/0446* (2019.05)

(58) Field of Classification Search
CPC . G06F 3/04164; G06F 3/04182; G06F 3/0446

USPC ......................................... 345/156
See application file for complete search history.

(56) References Cited

U.S. PATENT DOCUMENTS

| | | |
|---|---|---|
| 8,604,808 B2 | 12/2013 | Oda |
| 9,383,862 B2 | 7/2016 | Tokita et al. |
| 10,067,601 B2 | 9/2018 | Kurasawa et al. |
| 10,139,960 B2 | 11/2018 | Tokita et al. |
| 10,303,291 B2 | 5/2019 | Kurasawa et al. |
| 10,303,304 B2 | 5/2019 | Tokita et al. |
| 10,444,906 B2 | 10/2019 | Tokita et al. |
| 10,572,062 B2 | 2/2020 | Kurasawa et al. |
| 2010/0302194 A1 | 12/2010 | Park et al. |

(Continued)

FOREIGN PATENT DOCUMENTS

| | | | |
|---|---|---|---|
| JP | 2011-007528 A | | 1/2011 |
| JP | 2011007528 A | * | 1/2011 |

(Continued)

OTHER PUBLICATIONS

International Search Report (including English Language Translation), dated May 26, 2020 by the Japan Patent Office (JPO), in International Application No. PCT/JP2020/006974.

*Primary Examiner* — Mark Edwards
(74) *Attorney, Agent, or Firm* — Greenblum & Bernstein, P.L.C.

(57) ABSTRACT

In a display system, a display device includes multiple sensor electrodes divided into multiple groups. A second drive circuit supplies, to the multiple sensor electrodes, a touch drive signal having a phase different for each group. A touch detection circuit performs detection of a touch by an object on the display device, based on a detection signal received from the multiple sensor electrodes.

11 Claims, 12 Drawing Sheets

(56) References Cited

U.S. PATENT DOCUMENTS

| | | | |
|---|---|---|---|
| 2011/0241651 A1* | 10/2011 | Oda | G06F 3/04182 |
| | | | 324/76.39 |
| 2014/0085235 A1 | 3/2014 | Tokita et al. | |
| 2016/0357346 A1 | 12/2016 | Tokita et al. | |
| 2017/0262121 A1* | 9/2017 | Kurasawa | G06F 3/04166 |
| 2018/0348951 A1 | 12/2018 | Kurasawa et al. | |
| 2019/0073087 A1 | 3/2019 | Tokita et al. | |
| 2019/0235700 A1 | 8/2019 | Tokita et al. | |
| 2019/0243507 A1 | 8/2019 | Kurasawa et al. | |

FOREIGN PATENT DOCUMENTS

| | | |
|---|---|---|
| JP | 2011-210016 A | 10/2011 |
| JP | 2012-528352 A | 11/2012 |
| JP | 2014-066742 A | 4/2014 |
| JP | 2017-162255 A | 9/2017 |
| WO | 2018/123813 A1 | 7/2018 |

\* cited by examiner

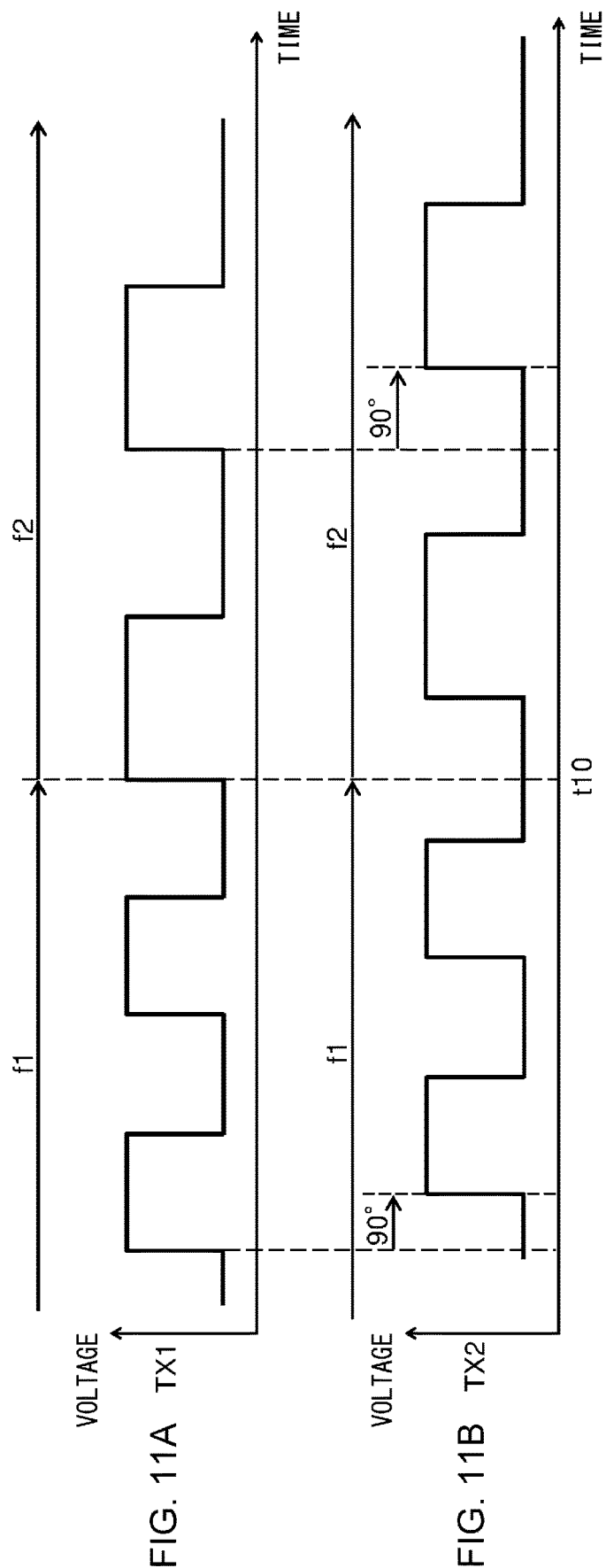

DISPLAY SYSTEM AND CONTROL METHOD

BACKGROUND

1. Field

The present disclosure relates to a display system provided with a touch detection function, a control device, and a control method.

2. Description of the Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.
[Patent Literature 1] WO2018/123813

SUMMARY

For display devices, further improvement has been required.

To solve the problem above, a display system according to one aspect of the present disclosure includes: a display device including multiple sensor electrodes divided into multiple groups; a drive circuit that supplies, to the multiple sensor electrodes, a touch drive signal having a phase different for each group; and a touch detection circuit that performs detection of a touch by an object on the display device, based on a detection signal received from the multiple sensor electrodes.

Another aspect of the present disclosure is a control device. The control device controls a display device including multiple sensor electrodes divided into multiple groups. The control device includes: a drive circuit that supplies, to the multiple sensor electrodes, a touch drive signal having a phase different for each group; and a touch detection circuit that performs detection of a touch by an object on the display device, based on a detection signal received from the multiple sensor electrodes.

Yet another aspect of the present disclosure is a control method. The control method is used to control a display device including multiple sensor electrodes divided into multiple groups. The control method includes: supplying, to the multiple sensor electrodes, a touch drive signal having a phase different for each group; and performing detection of a touch by an object on the display device, based on a detection signal received from the multiple sensor electrodes.

A display system according to still yet another aspect of the present disclosure includes: a display device including multiple touch detection regions and multiple common electrodes among which multiple common electrodes are arranged in each of the touch detection regions; a drive circuit that supplies a touch drive signal to the multiple common electrodes; a touch detection circuit that performs, based on a signal received from multiple common electrodes in a touch detection region as a detection target, detection of a touch by an object on the touch detection region as a detection target; and a control circuit that controls the drive circuit. The control circuit provides control such that the amplitude of a touch drive signal supplied to at least one common electrode other than multiple common electrodes in the touch detection region as a detection target becomes smaller than the amplitude of a touch drive signal supplied to the multiple common electrodes in the touch detection region as a detection target.

A further aspect of the present disclosure is a control method. The control method is used in a display system including: a display device including multiple touch detection regions and multiple common electrodes among which multiple common electrodes are arranged in each of the touch detection regions; a drive circuit that supplies a touch drive signal to the multiple common electrodes; and a touch detection circuit that performs, based on a signal received from multiple common electrodes in a touch detection region as a detection target, detection of a touch by an object on the touch detection region as a detection target. The control method includes providing control such that the amplitude of a touch drive signal supplied to multiple common electrodes in at least one touch detection region other than the touch detection region as a detection target becomes smaller than the amplitude of a touch drive signal supplied to multiple common electrodes in the touch detection region as a detection target.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 11A is a diagram that shows a waveform of a touch drive signal with a first phase in a third embodiment, and FIG. 11B is a diagram that shows a waveform of a touch drive signal with a second phase in the third embodiment;

DETAILED DESCRIPTION

Figure 1:
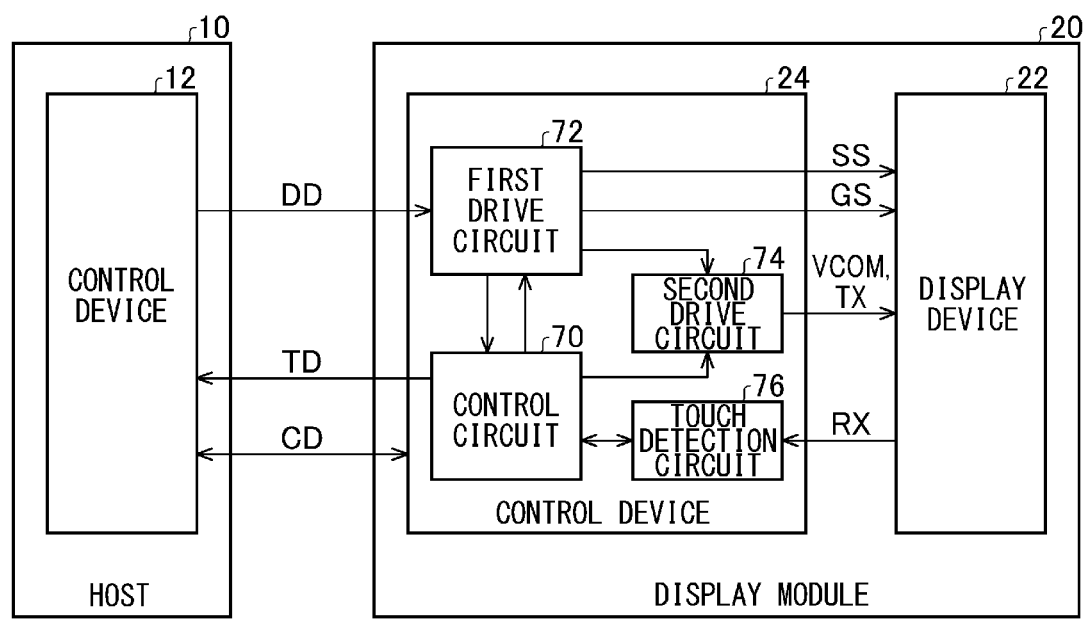
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments is given, the base findings will be described. The inventor has found a problem that, in a touch display, radiation of electromagnetic waves is caused by a touch drive signal used for touch detection, and the radiation may affect a peripheral receiver and the like. To solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to a first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a display module 20. The host 10 performs various functions, such as radio, car navigation, and Bluetooth (registered trademark) communication, and controls the display module 20. The host 10 includes a control device 12.

The control device 12 may be a CPU, for example, and also called a host CPU. The control device 12 supplies image data DD and control data CD to the display module 20 and controls the display module 20 based on such data.

The display module 20 includes a display device 22 and a control device 24. The display device 22 may be used as a center display on which a car navigation screen or the like is displayed within a vehicle cabin, for example.

The display device 22 is an in-cell liquid crystal display device of an in plane switching (IPS) type and configured as a touch display on which a touch position can be detected. The configuration of the display device 22 may be a well-known configuration as described below, for example.

Figure 2:
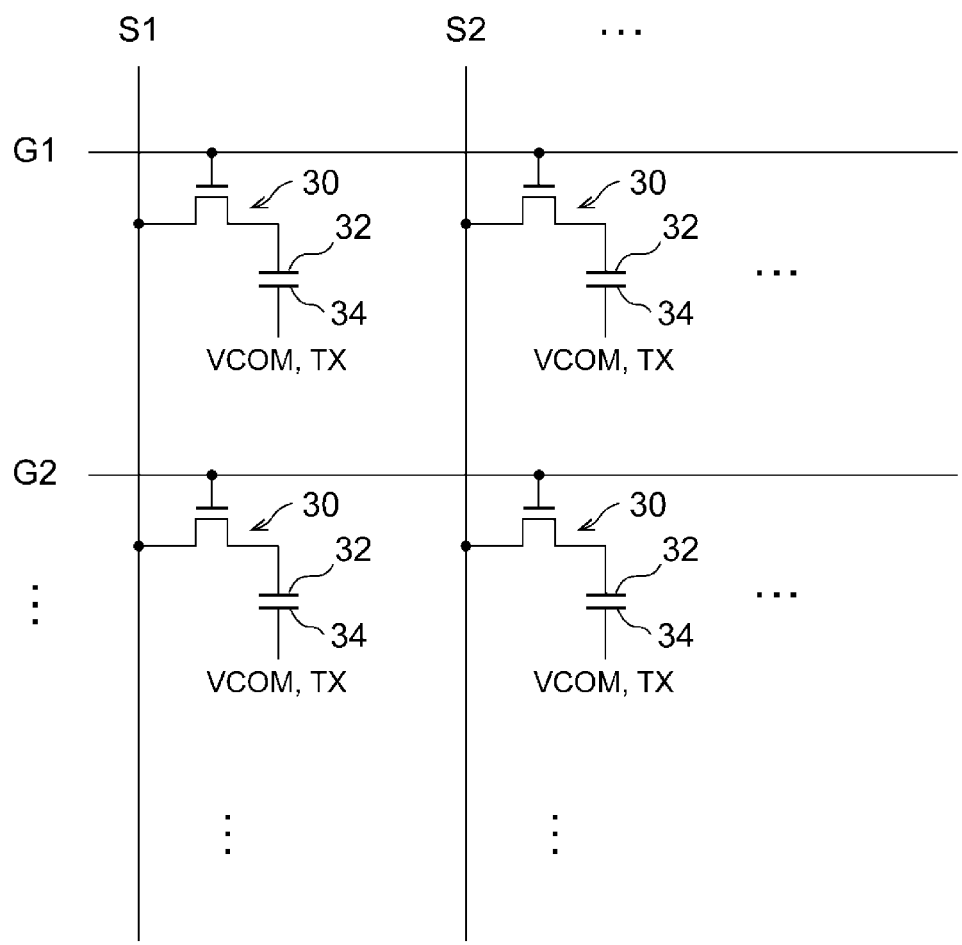
FIG. 2 is a diagram that schematically shows a circuit configuration of a display device shown in FIG. 1.

FIG. 2 schematically shows a circuit configuration of the display device 22 shown in FIG. 1. FIG. 2 also shows schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner. The common electrodes 34 may also be referred to as sensor electrodes.

Figure 3:
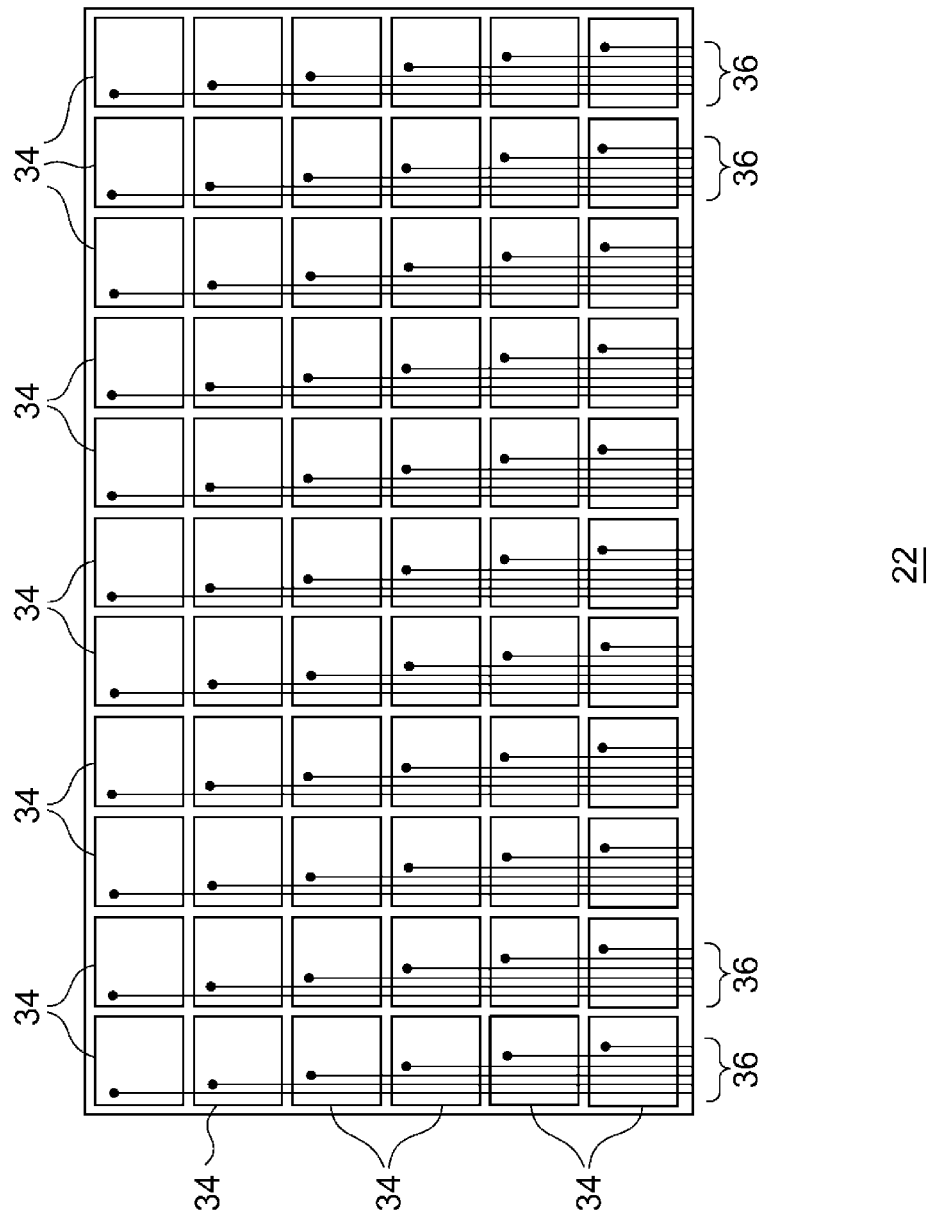
FIG. 3 is a top view that shows arrangement of common electrodes shown in FIG. 2.

FIG. 3 is a top view that shows arrangement of common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

The description now returns to FIG. 1. The control device 24 may be configured as an IC, for example, and controls the display device 22 based on the control data CD and the image data DD from the host 10. The control device 24 includes a control circuit 70, a first drive circuit 72, a second drive circuit 74, and a touch detection circuit 76.

The control circuit 70 may be configured as a microcomputer, for example, and controls signal generation timings of the first drive circuit 72 and the second drive circuit 74, touch detection timings of the touch detection circuit 76, and the like.

The control circuit 70 controls the first drive circuit 72, the second drive circuit 74, and the touch detection circuit 76 such that, during a frame period (one frame period), one frame of a display image is rendered on the display device 22 and touch detection for one screen is performed at least once. The frame period may also be referred to as a vertical synchronization period. The frame period will be detailed later.

The first drive circuit 72 generates a reference clock signal under the control of the control circuit 70. The first drive circuit 72 also generates, under the control of the control circuit 70, a source signal SS in synchronization with the generated reference clock signal, based on the image data DD from the host 10. The first drive circuit 72 also generates, under the control of the control circuit 70, a gate signal GS in synchronization with the generated reference clock signal.

The first drive circuit 72 supplies the source signal SS serially to multiple source lines in the display device 22, and also supplies the gate signal GS serially to multiple gate lines in the display device 22.

The first drive circuit 72 supplies the reference clock signal to the second drive circuit 74. The second drive circuit 74 generates a reference voltage VCOM, which is a predetermined fixed voltage, and also generates a touch drive signal TX, which is a square wave signal, based on the reference clock signal, under the control of the control circuit 70. Through the signal lines 36 shown in FIG. 3, the second drive circuit 74 supplies the reference voltage VCOM or the touch drive signal TX to the multiple common electrodes 34 of the entire display device 22. As will be described later, the second drive circuit 74 supplies a touch drive signal TX1 with a first phase to some of the common electrodes 34, and supplies a touch drive signal TX2 with a second phase, which is different from the first phase, to the rest of the common electrodes 34.

The touch detection circuit 76 detects a touch by an object on the display device 22. Under the control of the control circuit 70, the touch detection circuit 76 receives, from common electrodes 34, touch detection signals RX when a touch drive signal TX is supplied to the common electrodes 34 and performs detection of a touch position based on the touch detection signals RX. The touch detection circuit 76 outputs touch position information regarding the touch position thus detected to the control circuit 70.

Based on the touch position information from the touch detection circuit 76, the control circuit 70 derives coordinate data TD of the touch position and outputs the coordinate data TD to the control device 12 in the host 10. The control device 12 performs various processes based on the coordinate data TD.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

In the following, the control of the display device 22 performed by the control circuit 70 and the operations of the display device 22 will be specifically described. The control circuit 70 alternately repeats partial image display on one of multiple display regions within the screen and partial touch detection on two of multiple touch detection regions within the screen, so as to control the image display and the touch detection in a time division manner.

Figure 4:
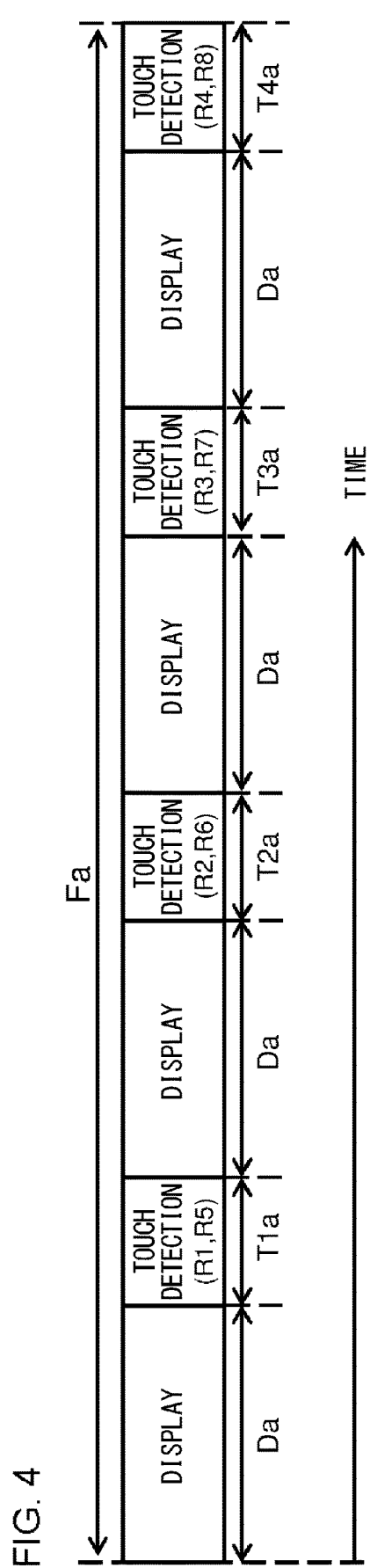
FIG. 4 is a diagram that shows timings within a frame period of the display device shown in FIG. 1.

FIG. 4 shows timings within a frame period Fa of the display device 22 shown in FIG. 1. The frame period Fa includes four display periods Da and four touch detection periods T1a, T2a, T3a, and T4a. The display periods Da and the touch detection periods are alternately arranged. In each frame period Fa, the display period Da, touch detection period T1a, display period Da, touch detection period T2a, display period Da, touch detection period T3a, display period Da, and touch detection period T4a are arranged in this order. The display periods Da each have the same length. Also, the touch detection periods T1a through T4a each have the same length. The number of display periods Da and the number of touch detection periods in a frame period Fa are not limited to "four".

The display device 22 displays one-quarter of a frame for each display period Da. Accordingly, one frame is displayed in the four display periods Da within a frame period Fa. More specifically, during a display period Da, the first drive circuit 72 supplies the source signal SS to the multiple source lines and also supplies the gate signal GS to corresponding gate lines, and the second drive circuit 74 supplies the reference voltage VCOM to the multiple common electrodes 34. The second drive circuit 74 stops supply of the touch drive signal TX during the display periods Da.

Figure 5A:
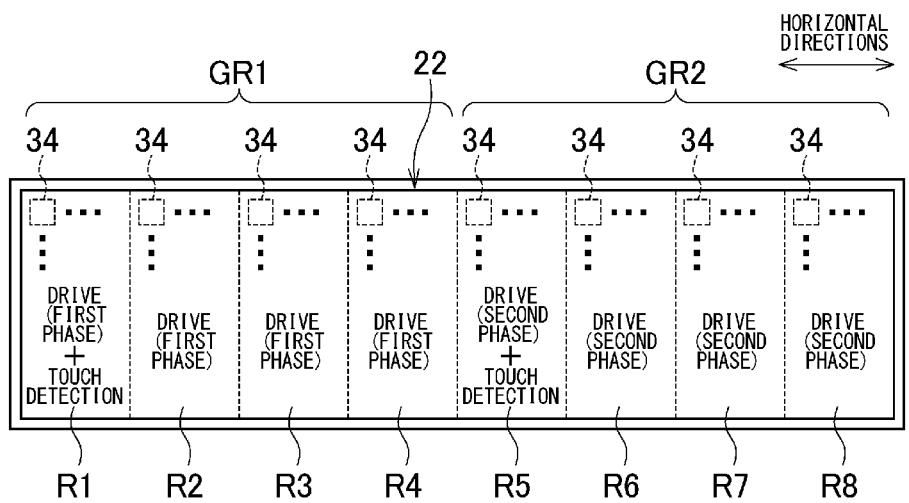
FIG. 5A is a diagram used to describe operations of the display device during a touch detection period T1$a$ shown in FIG. 4.

FIG. 5A is a diagram used to describe operations of the display device 22 during the touch detection period T1a shown in FIG. 4. The display device 22 includes touch detection regions R1, R2, R3, R4, R5, R6, R7, and R8 horizontally arranged in this order from the left to the right when viewed from the viewer. Among the multiple common electrodes 34 of the entire display device 22, multiple common electrodes 34 are arranged in each of the touch detection regions R1 through R8. The number of touch detection regions in the display device 22 is not limited to "eight".

The multiple common electrodes 34 are divided in advance into two groups of a group GR1 and a group GR2. The common electrodes 34 in the touch detection regions R1 through R4 are included in the group GR1. The common electrodes 34 in the touch detection regions R5 through R8 are included in the group GR2. The number of common electrodes 34 in the group GR1 may be equal to the number of common electrodes 34 in the group GR2, for example.

During the touch detection period T1a, the second drive circuit 74 simultaneously supplies the touch drive signal TX1 with the first phase to the multiple common electrodes 34 in the touch detection regions R1, R2, R3, and R4, and also simultaneously supplies the touch drive signal TX2 with the second phase to the multiple common electrodes 34 in the touch detection regions R5, R6, R7, and R8. In other words, the second drive circuit 74 simultaneously supplies, to multiple common electrodes 34, touch drive signals TX that each have a phase different for each group. The second drive circuit 74 performs the same operation during each touch detection period.

Figure 5B:
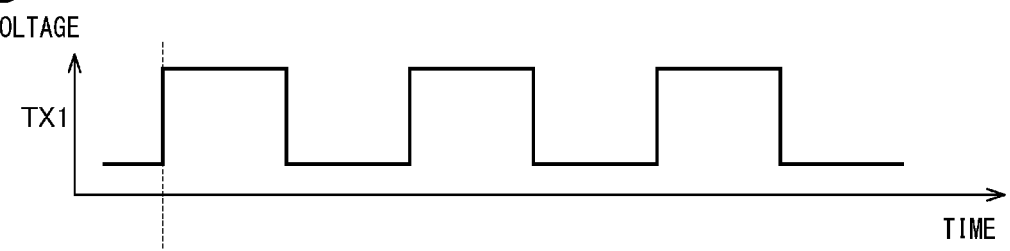
FIG. 5B is a diagram that shows a waveform of a touch drive signal with a first phase.
Figure 5C:
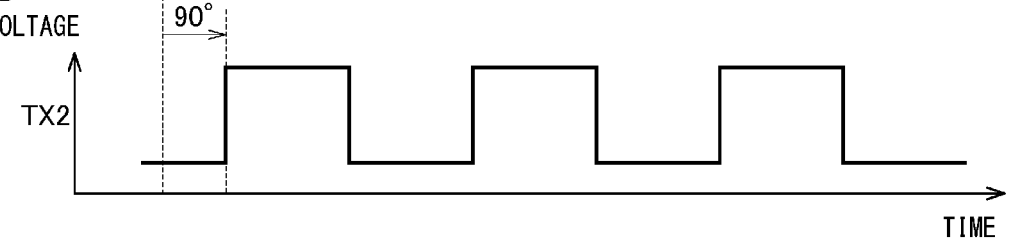
FIG. 5C is a diagram that shows a waveform of a touch drive signal with a second phase.

FIG. 5B shows a waveform of the touch drive signal TX1 with the first phase, and FIG. 5C shows a waveform of the touch drive signal TX2 with the second phase. In this example, the first phase is 0 degrees, and the second phase is 90 degrees. Accordingly, the phase difference between the touch drive signal TX1 and the touch drive signal TX2 is 90 degrees. The touch drive signal TX1 and the touch drive signal TX2 have substantially identical frequencies, and also have substantially identical duty ratios.

During the touch detection period T1a, based on the touch detection signals RX received from the multiple common electrodes 34 in the touch detection region R1 as a detection target among the multiple touch detection regions, the touch detection circuit 76 performs detection of a touch by an object on the touch detection region R1. Also, during the touch detection period T1a, based on the touch detection signals RX received from the multiple common electrodes 34 in the touch detection region R5 as another detection target among the multiple touch detection regions, the touch detection circuit 76 performs detection of a touch by an object on the touch detection region R5. The touch detection region R1 as a detection target and the touch detection region R5 as another detection target are not adjacent to each other.

Figure 6A:
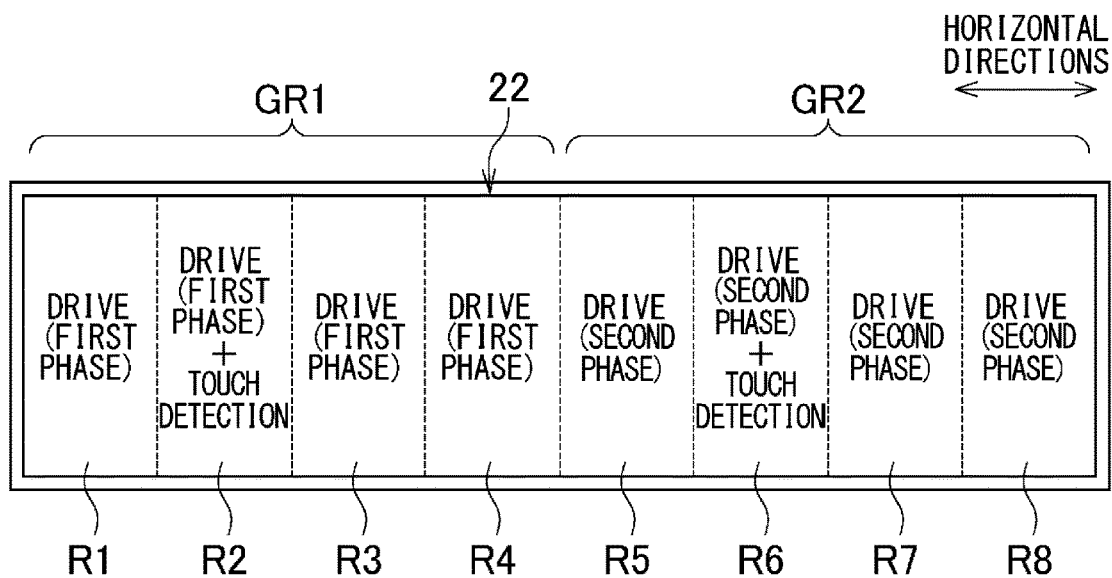
FIG. 6A is a diagram used to describe operations of the display device during a touch detection period T2$a$.

FIG. 6A is a diagram used to describe operations of the display device 22 during the touch detection period T2a. During the touch detection period T2a, the touch detection circuit 76 performs, based on the touch detection signals RX received from the multiple common electrodes 34 in the touch detection region R2 as a detection target, detection of a touch by an object on the touch detection region R2, and also performs, based on the touch detection signals RX received from the multiple common electrodes 34 in the touch detection region R6 as another detection target, detection of a touch by an object on the touch detection region R6.

Figure 6B:
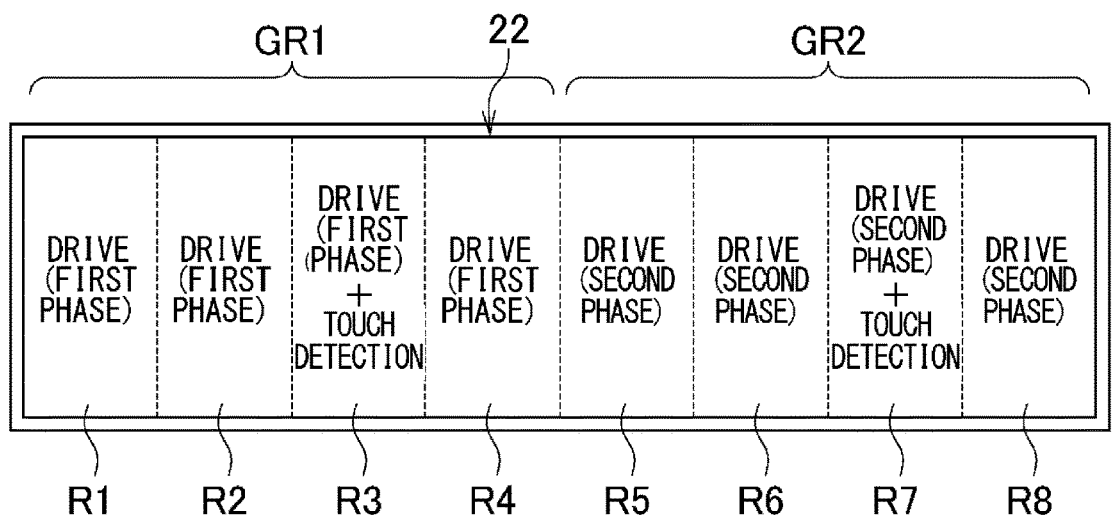
FIG. 6B is a diagram used to describe operations of the display device during a touch detection period T3$a$.

FIG. 6B is a diagram used to describe operations of the display device 22 during the touch detection period T3a. During the touch detection period T3a, the touch detection circuit 76 performs, based on the touch detection signals RX received from the multiple common electrodes 34 in the touch detection region R3 as a detection target, detection of a touch by an object on the touch detection region R3, and also performs, based on the touch detection signals RX received from the multiple common electrodes 34 in the touch detection region R7 as another detection target, detection of a touch by an object on the touch detection region R7.

Figure 6C:
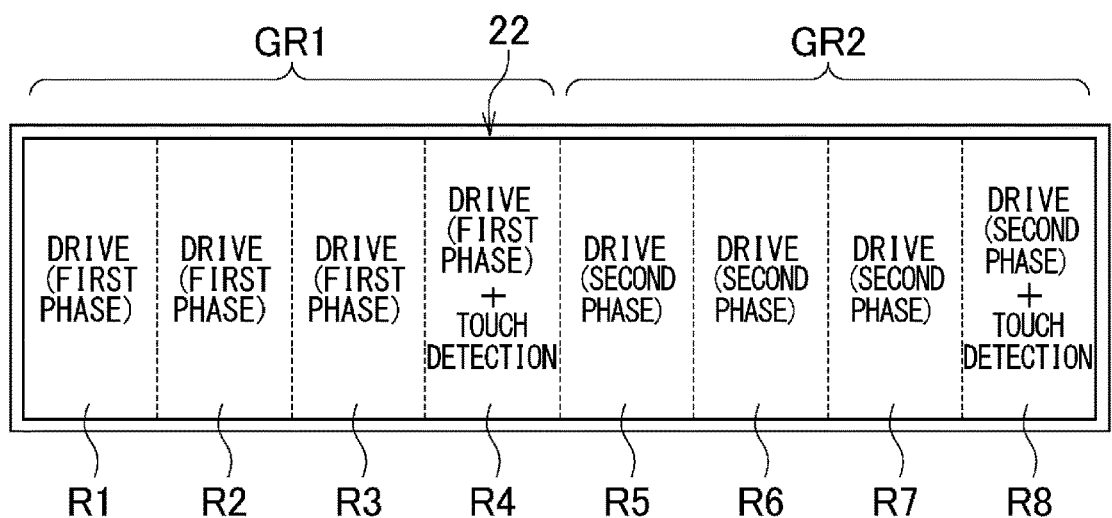
FIG. 6C is a diagram used to describe operations of the display device during a touch detection period T4$a$.

FIG. 6C is a diagram used to describe operations of the display device 22 during the touch detection period T4a. During the touch detection period T4a, the touch detection circuit 76 performs, based on the touch detection signals RX received from the multiple common electrodes 34 in the touch detection region R4 as a detection target, detection of a touch by an object on the touch detection region R4, and also performs, based on the touch detection signals RX received from the multiple common electrodes 34 in the touch detection region R8 as another detection target, detection of a touch by an object on the touch detection region R8.

Thus, the touch detection circuit 76 serially changes the touch detection region as a detection target and the touch detection region as another detection target, so as to perform touch detection in touch detection regions different for each touch detection period. During the four touch detection periods in a frame period Fa, touch detection for one screen is performed once. In this example, since the display device 22 includes touch detection regions twice as many as the touch detection periods included in a frame period Fa, touch detection is performed simultaneously in two touch detection regions during a touch detection period. Meanwhile, the display device 22 may include touch detection regions equal in number to the touch detection periods in a frame period Fa, and, in this case, the touch detection circuit 76 performs touch detection in one touch detection region during each touch detection period.

A comparative example will now be described. The comparative example differs from the present embodiment in that a touch drive signal TX in common is supplied to the multiple common electrodes 34 in the entire display device 22. In other words, touch drive signals TX with the same phase are simultaneously supplied to all the common electrodes 34. Accordingly, noise emitted from each common electrode 34 to the outside of the display device 22 is added together in the same phase, and such added noise is recognized as radiation.

In contrast with the comparative example, in the present embodiment, the touch drive signal TX1 and the touch drive signal TX2 having different phases are supplied, as described previously. Accordingly, noise emitted from the common electrodes 34 supplied with the touch drive signal TX1 and noise emitted from the common electrodes 34 supplied with the touch drive signal TX2 is added together in different phases. As a result, peak levels of radiation are lowered, compared to the comparative example.

Figure 7:
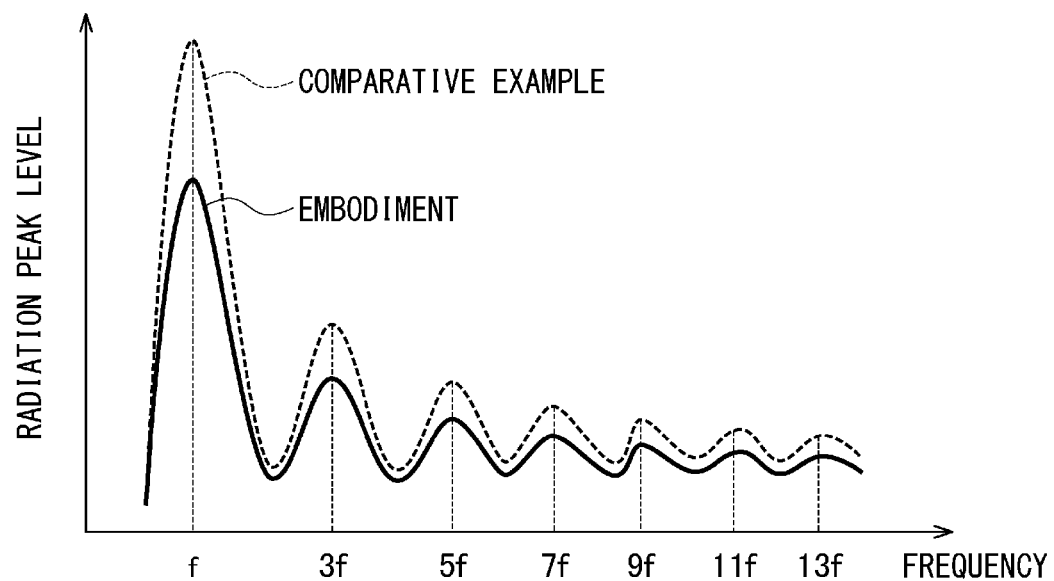
FIG. 7 is a diagram that shows frequency characteristics of peak levels of radiation in the first embodiment and a comparative example.

FIG. 7 shows frequency characteristics of peak levels of radiation in the first embodiment and the comparative example. When the frequency of the touch drive signal TX is defined as f, the peak level of the frequency component at the frequency f or the frequency 3f, which is three times the frequency f, in the present embodiment is lower than that in the comparative example. Therefore, radiation of electromagnetic waves from the display device 22 due to the touch drive signal TX can be reduced, compared to the comparative example.

Figure 8:
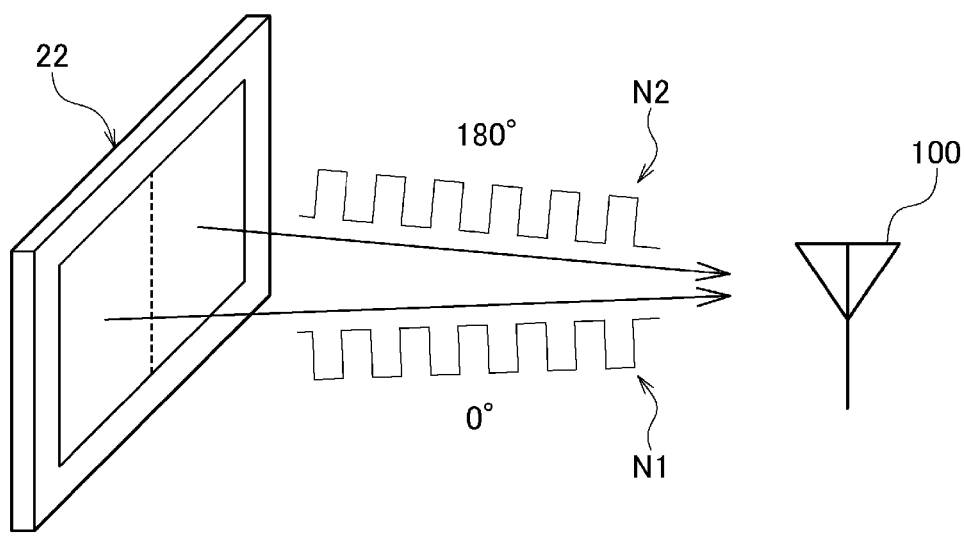
FIG. 8 is a diagram used to describe reduction of radiation when the difference between the first phase and the second phase is 180 degrees.

The difference between the first phase and the second phase is not particularly limited, but may be suitably closer to 180 degrees, with which the effect of reducing radiation is more likely to increase. FIG. 8 is a diagram used to describe reduction of radiation when the difference between the first phase and the second phase is 180 degrees. The display device 22 emits noise N1 caused by the touch drive signal TX1 with the first phase and also emits noise N2 caused by the touch drive signal TX2 with the second phase. Since the noise N1 and the noise N2 also has opposite phases, the noise N1 and the noise N2 added together is cancelled out. For example, radiation can be further reduced at the position of an antenna 100 as an external receiver positioned to face the display surface of the display device 22.

Figure 9:
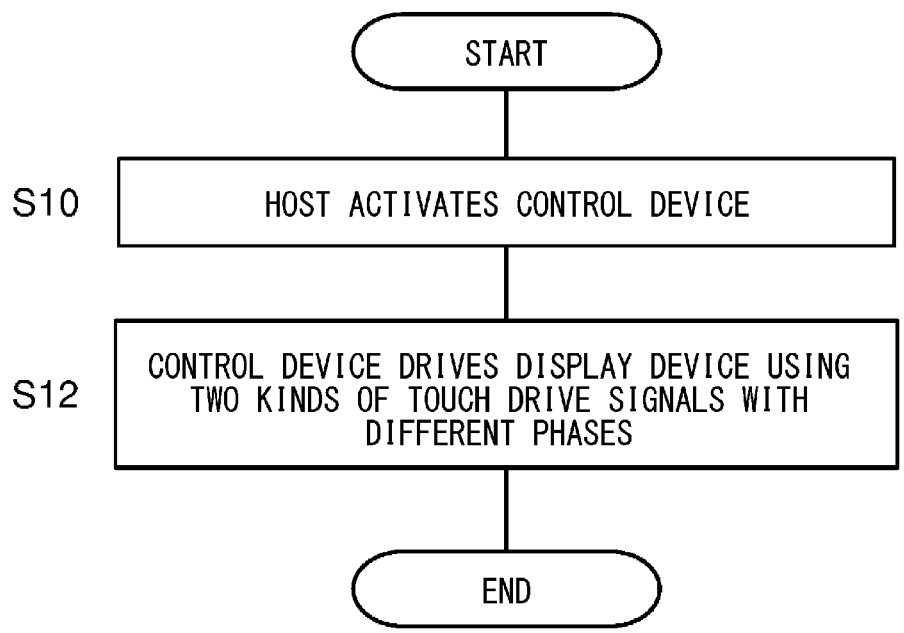
FIG. 9 is a flowchart that shows activation processing in the display system shown in FIG. 1.

There will now be described the overall operation of the display system 1 having the configuration set forth above. FIG. 9 is a flowchart that shows activation processing in the display system 1 shown in FIG. 1. The host 10 activates the control device 24 (S10). The control device 24 drives the display device 22 using two kinds of touch drive signals TX with different phases (S12), and the processing is terminated.

According to the present embodiment, since the touch drive signal TX1 and the touch drive signal TX2 have a phase difference, radiation from the display device 22 due to the touch drive signals can be reduced, compared to the comparative example. Also, since the common electrodes 34 supplied with the touch drive signal TX1 and the common electrodes 34 supplied with the touch drive signal TX2 are determined in advance and not changed within the frame period Fa, the control can be simplified.

Second Embodiment

The second embodiment differs from the first embodiment in that the common electrodes 34 in a touch detection region as a detection target and in a touch detection region adjacent to the touch detection region as a detection target are supplied with the touch drive signals TX having the same phase. In the following, description will be given mainly for the differences from the first embodiment.

Figure 10A:
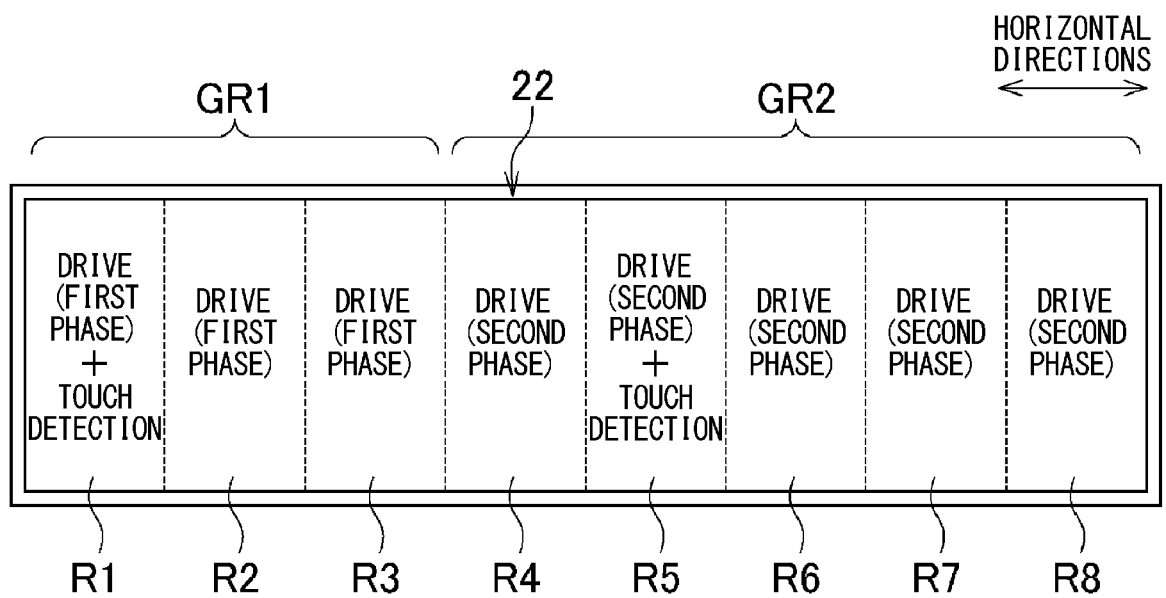
FIG. 10A is a diagram used to describe operations of the display device during the touch detection period T1$a$ in a second embodiment.

FIG. 10A is a diagram used to describe operations of the display device 22 during the touch detection period T1a in the second embodiment. The control circuit 70 is capable of changing the group division pattern such that multiple common electrodes 34 in a touch detection region as a detection target and in a touch detection region adjacent to the touch detection region as a detection target are included in the same one group, and multiple common electrodes 34 in a touch detection region as another detection target and in a touch detection region adjacent to the touch detection region as another detection target are included in the same another group. The control circuit 70 changes the group division pattern before the start of the touch detection period T1a.

In the touch detection period T1a, the common electrodes 34 in the touch detection regions R1 through R3 are included in the group GR1. The common electrodes 34 in the touch detection regions R4 through R8 are included in the group GR2. During the touch detection period T1a, the second drive circuit 74 simultaneously supplies the touch drive signal TX1 with the first phase to the multiple common electrodes 34 in the touch detection regions R1, R2, and R3, and also simultaneously supplies the touch drive signal TX2 with the second phase to the multiple common electrodes 34 in the touch detection regions R4, R5, R6, R7, and R8. In other words, the second drive circuit 74 supplies the touch drive signals TX1 with the same one phase to the common electrodes 34 in the touch detection region R1 as a detection target and in the touch detection region R2 adjacent to the touch detection region R1 as a detection target, and also supplies the touch drive signals TX2 with the same another phase to the common electrodes 34 in the touch detection region R5 as another detection target and in the touch detection regions R4 and R6 adjacent to the touch detection region R5 as another detection target.

The control circuit 70 changes the group division pattern to the same pattern as in the first embodiment before the start of the touch detection period T2a. The second drive circuit 74 performs, during the touch detection period T2a, the same operation as shown in FIG. 6A in the first embodiment and performs, during the touch detection period T3a, the same operation as shown in FIG. 6B in the first embodiment.

Figure 10B:
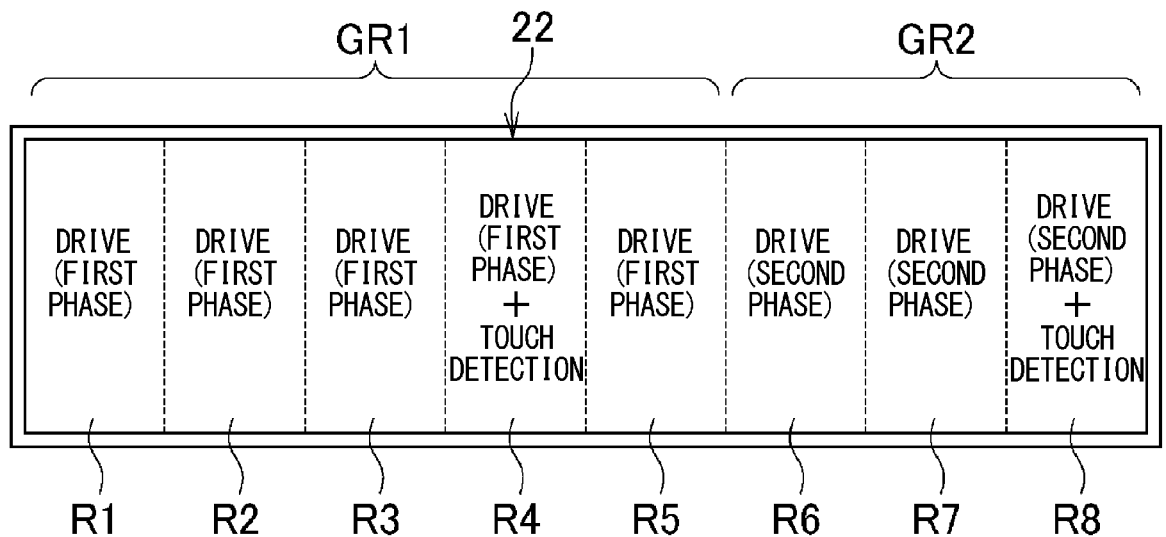
FIG. 10B is a diagram used to describe operations of the display device during the touch detection period T4$a$.

FIG. 10B is a diagram used to describe operations of the display device 22 during the touch detection period T4a in the second embodiment. The control circuit 70 changes the group division pattern before the start of the touch detection period T4a. In the touch detection period T4a, the common electrodes 34 in the touch detection regions R1 through R5 are included in the group GR1. The common electrodes 34 in the touch detection regions R6 through R8 are included in the group GR2. During the touch detection period T4a, the second drive circuit 74 simultaneously supplies the touch drive signal TX1 with the first phase to the multiple common electrodes 34 in the touch detection regions R1, R2, R3, R4, and R5, and also simultaneously supplies the touch drive signal TX2 with the second phase to the multiple common electrodes 34 in the touch detection regions R6, R7, and R8. In other words, the second drive circuit 74 supplies the touch drive signals TX1 with the same one phase to the common electrodes 34 in the touch detection region R4 as a detection target and in the touch detection regions R3 and R5 adjacent to the touch detection region R4 as a detection target, and also supplies the touch drive signals TX2 with the same another phase to the common electrodes 34 in the touch detection region R8 as another detection target and in the touch detection region R7 adjacent to the touch detection region R8 as another detection target.

With the abovementioned control, the parasitic capacitance between a common electrode 34 in the touch detection region as a detection target and a common electrode 34 adjacent thereto is not charged by the touch drive signal TX1, and the parasitic capacitance between a common electrode 34 in the touch detection region as another detection target and a common electrode 34 adjacent thereto is not charged by the touch drive signal TX2. Accordingly, the charging time of the parasitic capacitance in the common electrodes 34 in the touch detection region as a detection target and the touch detection region as another detection target is not longer than that in the comparative example in which all the common electrodes 34 are driven by a touch drive signal in common. Therefore, the touch detection timing can be maintained. Even with the touch detection timing maintained, the charge is not insufficient, so that degradation of touch detection sensitivity can also be restrained.

Third Embodiment

The third embodiment differs from the first embodiment in that the frequency of the touch drive signal TX is changed based on a result of exogenous noise detection. In the following, description will be given mainly for the differences from the first embodiment.

When the frequency of exogenous noise emitted from an electronic device or the like around the display system 1 is identical with the frequency of the touch drive signal TX, the accuracy and sensitivity of touch detection may be degraded. Accordingly, in the display system 1, based on the amount of exogenous noise, so-called frequency hopping control is performed. For the frequency hopping, well-known technologies may be employed.

When the supply of the touch drive signal TX is stopped, i.e., during a display period Da, the touch detection circuit 76 measures the amount of noise at each of predetermined multiple frequencies included in the touch detection signals RX received from the multiple common electrodes 34 in the display device 22. The multiple frequencies include the frequency of the touch drive signal TX. When noise at the frequency of the touch drive signal TX is detected at a predetermined level or higher, the touch detection circuit 76 outputs, to the control circuit 70, noise detection information that includes information regarding a frequency at which the minimum amount of noise has been measured.

Based on the noise detection information, the control circuit 70 controls the second drive circuit 74 such as to change the frequency of the touch drive signal TX to the frequency at which the amount of noise is minimum. Under the control of the control circuit 70, the second drive circuit 74 supplies, to the common electrodes 34, a touch drive signal TX having the frequency at which the amount of noise is minimum, i.e., a touch drive signal TX having a frequency different from the frequency at which the level of noise is the predetermined level or higher. This can restrain degradation of accuracy and sensitivity of touch detection caused by exogenous noise.

FIG. 11A shows a waveform of the touch drive signal TX1 with the first phase in the third embodiment, and FIG. 11B shows a waveform of the touch drive signal TX2 with the second phase in the third embodiment. These waveforms are those during a display period Da and are not supplied to the common electrodes 34.

When the touch drive signals TX1 and TX2 have a frequency f1 and when exogenous noise at the frequency f1 is detected at a predetermined level or higher at time t10, the frequency of the touch drive signals TX1 and TX2 after the time t10 is changed to a frequency f2 at which the amount of noise is minimum. Also after the change of the frequency, the second drive circuit 74 generates the touch drive signals TX that each have a phase different for each group. In other words, also after the change of the frequency, the phase difference between the touch drive signal TX1 and the touch drive signal TX2 is 90 degrees.

According to the present embodiment, even when the frequency of the touch drive signals TX is changed upon detection of exogenous noise, the phases of the touch drive signals TX are different for each group, so that radiation can be restrained.

Although the multiple common electrodes 34 are divided into two groups in the first through third embodiments, the multiple common electrodes 34 may be divided into three or more groups. Also in this case, the second drive circuit 74 supplies, to the multiple common electrodes 34 in parallel, touch drive signals TX that each have a phase different for each group. In the first embodiment, for example, each touch detection region may be allocated a group, so that the multiple common electrodes 34 may be divided into eight groups. Also, two touch detection regions adjacent to each other may be allocated a group, so that the multiple common electrodes 34 may be divided into four groups. In this modification, radiation can be reduced more easily.

In the second embodiment, the control circuit 70 may change the group division pattern such that multiple common electrodes 34 in a touch detection region as a detection target and, among the common electrodes 34 in a touch detection region adjacent to the touch detection region as a detection target, at least multiple common electrodes 34 located adjacent to the touch detection region as a detection target are included in the same one group, and multiple common electrodes 34 in a touch detection region as another detection target and, among the common electrodes 34 in a touch detection region adjacent to the touch detection region as another detection target, at least multiple common electrodes 34 located adjacent to the touch detection region as another detection target are included in the same another group.

For example, during the touch detection period T1a, the second drive circuit 74 may supply the touch drive signal TX1 with the first phase to multiple common electrodes 34 that are not adjacent to the touch detection region R5 as another detection target, among the multiple common electrodes 34 in the touch detection region R4, and also supply the touch drive signal TX2 with the second phase to multiple common electrodes 34 that are adjacent to the touch detection region R5 as another detection target, among the multiple common electrodes 34 in the touch detection region R4. Also, during the touch detection period T4a, the second drive circuit 74 may supply the touch drive signal TX1 with the first phase to multiple common electrodes 34 that are adjacent to the touch detection region R4 as a detection target, among the multiple common electrodes 34 in the touch detection region R5, and also supply the touch drive signal TX2 with the second phase to multiple common electrodes 34 that are not adjacent to the touch detection region R4 as a detection target, among the multiple common electrodes 34 in the touch detection region R5. In this modification, during each of the touch detection periods T1a and T4a, the number of common electrodes 34 supplied with the touch drive signal TX1 with the first phase is closer to the number of common electrodes 34 supplied with the touch drive signal TX2 with the second phase, so that radiation can be further reduced, compared to the second embodiment. Also, as is the case in the second embodiment, the touch detection timing can be maintained, and degradation of touch detection sensitivity can also be restrained.

The third embodiment may be combined with the second embodiment. An additional embodiment made by such a combination has the effect of each of the combined embodiments.

Although the control device 24 is included in the display module 20 in the first through third embodiments, the control device 24 may be included in the host 10. Also, although the first drive circuit 72 generates the reference clock signal in the first through third embodiments, the second drive circuit 74 may generate the reference clock signal. Also, the number of touch detection periods included in a frame period may be more than twice the number of touch detection regions in the display device 22. These modifications allow greater flexibility in the configuration of the display system 1.

Although an in-cell display device 22 has been described in the first through third embodiments, an out-cell display device 22, on which a touch is detected based on the self-capacitance method or the mutual capacitance method, may also be employed, for example. In this case, the display device 22 includes multiple sensor electrodes used only for touch detection, and touch drive signals TX that each have a phase different for each group are simultaneously supplied to the multiple sensor electrodes. The display device 22 performs touch detection using the sensor electrodes, in parallel with image display. Also with the out-cell display device 22, radiation can be restrained.

Fourth Embodiment

In the fourth embodiment, smaller amplitude is set for a touch drive signal TX supplied to a common electrode 34 that is not included in a touch detection region as a detection target. In the following, description will be given mainly for the differences from the first embodiment.

Under the control of the control circuit 70, the second drive circuit 74 sets the amplitude of a touch drive signal TX. The second drive circuit 74 supplies touch drive signals TX with the same phase and the same frequency to multiple common electrodes 34.

The control circuit 70 provides control such that the amplitude of a touch drive signal TX supplied to at least one common electrode 34 other than multiple common electrodes 34 in a touch detection region as a detection target becomes smaller than amplitude V1 of a touch drive signal TX supplied to the multiple common electrodes 34 in the touch detection region as a detection target. Accordingly, compared to the case where the touch drive signal TX having the amplitude V1 is supplied to all the common electrodes 34, radiation caused by the touch drive signals TX can be reduced, and power consumption can also be reduced.

The amplitude V1 may be appropriately determined through experiments or the like such that touch detection can be performed in a touch detection region as a detection target. A touch drive signal TX changes between a low level and a high level, and the difference between the low level and the high level is defined as amplitude.

The radiation and the power consumption can be reduced when a touch drive signal TX with relatively larger amplitude V1 is supplied to a smaller number of common electrodes 34. Accordingly, the control circuit 70 may provide control such that the amplitude of a touch drive signal TX supplied to common electrodes 34 other than the common electrodes 34 in a touch detection region as a detection target and the common electrodes 34 located adjacent to the touch detection region as a detection target becomes smaller than the amplitude V1.

In this case, the control circuit 70 may provide control to equally set the amplitude of a touch drive signal TX supplied to common electrodes 34 other than the common electrodes 34 in the touch detection region as a detection target and the common electrodes 34 located adjacent to the touch detection region as a detection target to amplitude V2. The amplitude V2 is smaller than the amplitude V1. The amplitude V2 may be appropriately determined through experiments or the like, and may also be zero. When the amplitude V2 is smaller, the effect of reducing the radiation and power consumption can be increased.

The control circuit 70 provides control such that the amplitude of a touch drive signal TX supplied to the common electrodes 34 located adjacent to the touch detection region as a detection target becomes substantially identical with the amplitude V1. The amplitude of the touch drive signal TX supplied to the common electrodes 34 located adjacent to the touch detection region as a detection target may be smaller than the amplitude V1, but the amplitude of the touch drive signal TX may suitably be closer to the amplitude V1, and may more suitably be substantially identical with the amplitude V1.

In the following, an example will be described in which the display device 22 includes touch detection regions equal in number to the touch detection periods in a frame period Fa. Accordingly, the touch detection circuit 76 performs touch detection in one touch detection region during each touch detection period. The number of touch detection periods in a frame period Fa and the number of touch detection regions included in the display device 22 are not particularly limited.

Figure 12A:
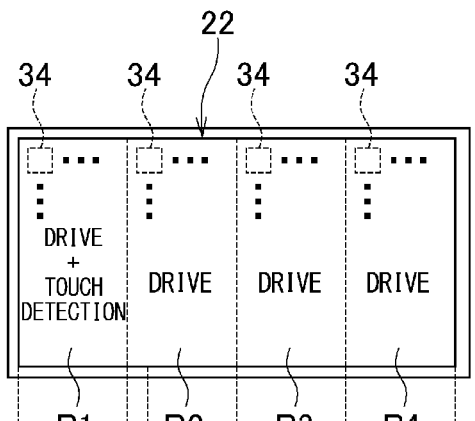
FIG. 12A is a diagram used to describe operations of the display device during the touch detection period T1*a* in a fourth embodiment.
Figure 12B:
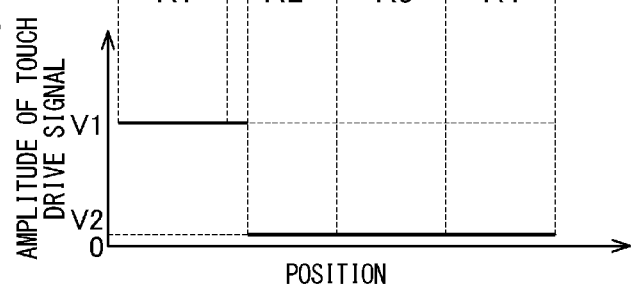
FIG. 12B is a diagram that shows relationships between a position in a horizontal direction in the display device shown in FIG. 12A and amplitude of the touch drive signal.

FIG. 12A is a diagram used to describe operations of the display device 22 during the touch detection period Tia in the fourth embodiment. FIG. 12B shows relationships between a position in a horizontal direction in the display device 22 shown in FIG. 12A and amplitude of the touch drive signal TX.

During the touch detection period Tia, the second drive circuit 74 supplies the touch drive signal TX with the amplitude V1 to the common electrodes 34 in the touch detection region R1 as a detection target and common electrodes 34 located adjacent to the touch detection region R1 as a detection target. The common electrodes 34 located adjacent to the touch detection region R1 as a detection target are common electrodes 34 in the touch detection region R2 located closest to the touch detection region R1 side.

During the touch detection period Tia, the second drive circuit 74 also supplies the touch drive signal TX with the amplitude V2 to the rest of the common electrodes 34 in the touch detection region R2 and the multiple common electrodes 34 in the touch detection region R3 and the touch detection region R4.

Figure 12C:
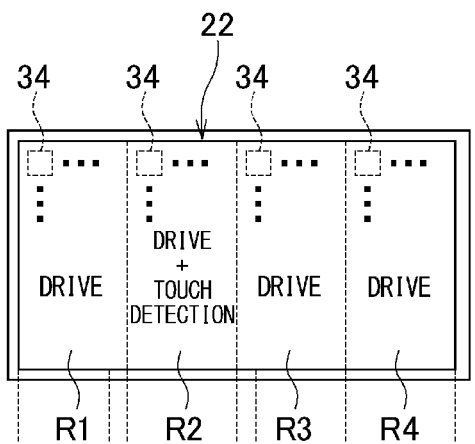
FIG. 12C is a diagram used to describe operations of the display device during the touch detection period T2*a*.
Figure 12D:
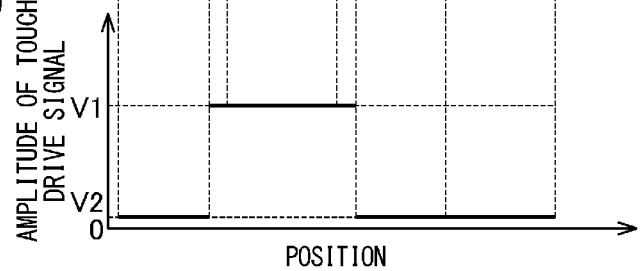
FIG. 12D is a diagram that shows relationships between a position in a horizontal direction in the display device shown in FIG. 12C and amplitude of the touch drive signal.

FIG. 12C is a diagram used to describe operations of the display device 22 during the touch detection period T2a in the fourth embodiment. FIG. 12D shows relationships between a position in a horizontal direction in the display device 22 shown in FIG. 12C and amplitude of the touch drive signal TX.

During the touch detection period T2a, the second drive circuit 74 supplies the touch drive signal TX with the amplitude V1 to the common electrodes 34 in the touch detection region R2 as a detection target and common electrodes 34 located adjacent to the touch detection region R2 as a detection target. The common electrodes 34 located adjacent to the touch detection region R2 as a detection target are common electrodes 34 in the touch detection region R1 located closest to the touch detection region R2 side, and common electrodes 34 in the touch detection region R3 located closest to the touch detection region R2 side.

During the touch detection period T2a, the second drive circuit 74 also supplies the touch drive signal TX with the amplitude V2 to the rest of the common electrodes 34 in the touch detection region R1, the rest of the common electrodes 34 in the touch detection region R3, and the multiple common electrodes 34 in the touch detection region R4.

The second drive circuit 74 also performs similar operations during the touch detection periods T3a and T4a, though illustration thereof is omitted.

According to the present embodiment, compared to the case where all the common electrodes 34 are driven by a touch drive signal TX in common, radiation of electromagnetic waves from the display device 22 due to the touch drive signals TX can be reduced, and power consumption can also be reduced.

Also, even when the amplitude of a touch drive signal TX supplied to some of the common electrodes 34 is small, the common electrodes 34 located adjacent to the touch detection region as a detection target are supplied with a touch drive signal TX of which the amplitude is substantially identical with that of the touch drive signal TX supplied to the touch detection region as a detection target. Accordingly, the parasitic capacitance between a common electrode 34 in the touch detection region as a detection target and a common electrode 34 adjacent thereto is not charged by the touch drive signal TX. Therefore, the charging time of the parasitic capacitance in the common electrodes 34 in the touch detection region as a detection target is not longer than that in the case where all the common electrodes 34 are driven by a touch drive signal TX in common. Accordingly, the touch detection timing in the touch detection region as a detection target can be maintained.

The control circuit 70 may provide control such that the amplitude of a touch drive signal TX supplied to common electrodes 34 other than the common electrodes 34 in a touch detection region as a detection target and the common electrodes 34 located adjacent to the touch detection region as a detection target becomes smaller as the distance from the touch detection region as a detection target is larger. In other words, the amplitude of the touch drive signal TX supplied to such common electrodes 34 may be changed in a slope shape based on the position. This modification allows greater flexibility in the configuration of the display system 1.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

For example, although the control device 24 is included in the display module 20 in the fourth embodiment, the control device 24 may be included in the host 10. Also, although the first drive circuit 72 generates the reference clock signal in the fourth embodiment, the second drive circuit 74 may generate the reference clock signal. Also, the number of touch detection periods included in a frame period may be more than twice the number of touch detection regions in the display device 22. These modifications allow greater flexibility in the configuration of the display system 1.

Figure 13:
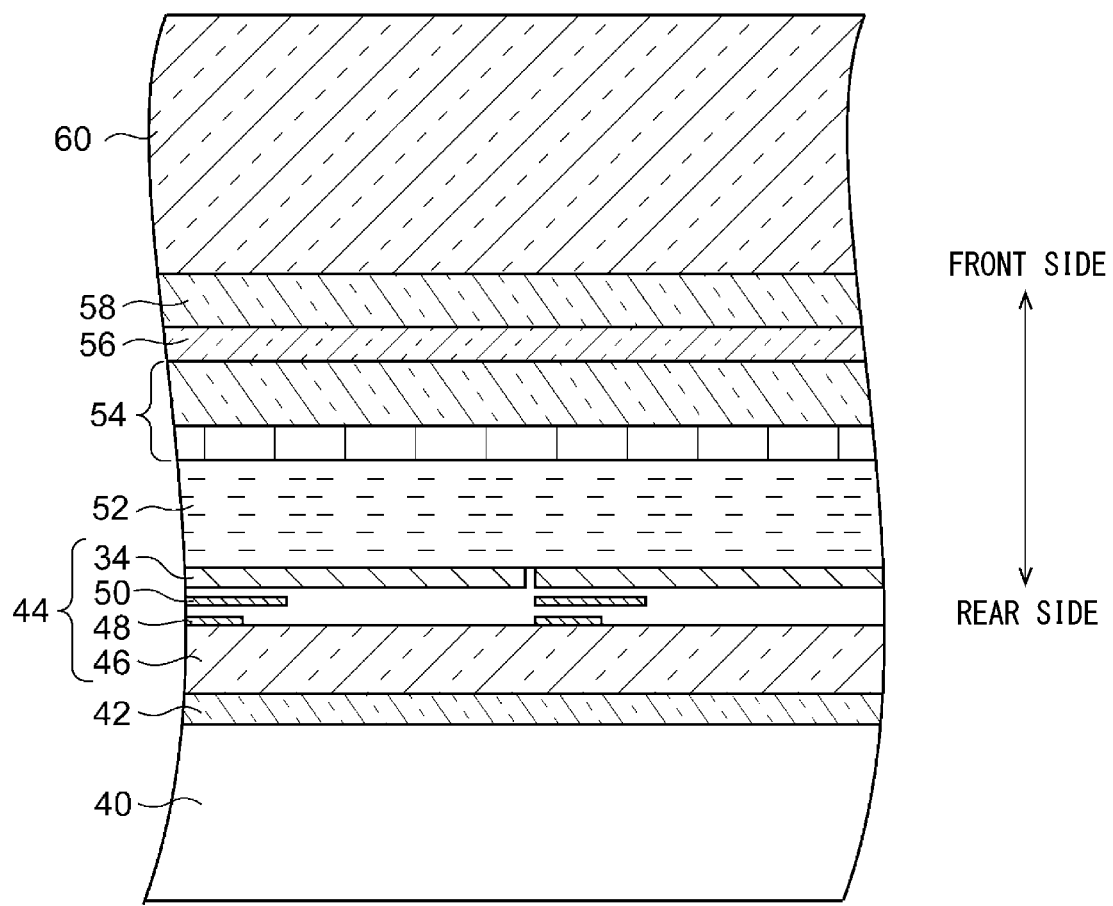
FIG. 13 is a longitudinal sectional view of the display device shown in FIG. 1.

The display device 22 may have a configuration as described below, for example. FIG. 13 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing a transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens or the like.

A display system according to one aspect of the present disclosure includes:

a display device including multiple sensor electrodes divided into multiple groups;

a drive circuit that supplies, to the multiple sensor electrodes, a touch drive signal having a phase different for each group; and a touch detection circuit that performs detection of a touch by an object on the display device, based on a detection signal received from the multiple sensor electrodes.

According to this aspect, since the noise emitted from common electrodes in one group and the noise emitted from common electrodes in another group is added together in different phases, peak levels of radiation are lowered, compared to the case of supplying touch drive signals having the same phase. Therefore, radiation can be reduced.

In the display system according to the one aspect of the present disclosure, for example, the multiple sensor electrodes may be divided into two groups, and the drive circuit may supply a touch drive signal with a first phase to sensor electrodes in one group and supply a touch drive signal with a second phase that is 180 degrees different from the first phase to sensor electrodes in the other group.

In this case, the noise caused by the touch drive signal with the first phase and the noise caused by the touch drive signal with the second phase is likely to be cancelled out, so that the radiation can be further reduced.

In the display system according to the one aspect of the present disclosure, for example, the display device may include multiple touch detection regions, and, among the multiple sensor electrodes, multiple sensor electrodes may be arranged in each of the touch detection regions, the sensor electrodes may be common electrodes used for both image display and touch detection, the touch detection circuit may perform, based on a detection signal received from a sensor electrode in a touch detection region as a detection target among the multiple touch detection regions, detection of a touch by an object on the touch detection region as a detection target, and one of the multiple groups may include multiple sensor electrodes in the touch detection region as a detection target.

In this case, with the common electrodes used for both image display and touch detection, the display device can be made thinner.

In the display system according to the one aspect of the present disclosure, for example, the touch detection circuit may serially change the touch detection region as a detection target, and the display system may further include a control circuit capable of changing a group division pattern such that multiple sensor electrodes in the touch detection region as a detection target and multiple sensor electrodes located adjacent to the touch detection region as a detection target are included in the same group.

In this case, the charging time of the parasitic capacitance in the common electrodes in the touch detection region as a detection target does not become longer, so that the touch detection timing can be maintained, and degradation of touch detection sensitivity can also be restrained.

In the display system according to the one aspect of the present disclosure, for example, when the touch detection circuit performs detection of a touch by an object on the touch detection region as a detection target, the touch detection circuit may also perform, based on a detection signal received from multiple sensor electrodes in a touch detection region as another detection target among the multiple touch detection regions, detection of a touch by an object on the touch detection region as another detection target, and multiple sensor electrodes in the touch detection region as another detection target may be included in a group different from the group of multiple sensor electrodes in the touch detection region as a detection target.

In this case, when touch detection is performed simultaneously in two touch detection regions, radiation can be reduced.

In the display system according to the one aspect of the present disclosure, for example, the touch detection circuit may serially change the touch detection region as a detection target and the touch detection region as another detection target, and the display system may further include a control circuit capable of changing a group division pattern such that multiple sensor electrodes in the touch detection region as a detection target and multiple sensor electrodes located adjacent to the touch detection region as a detection target are included in the same one group, and also such that multiple sensor electrodes in the touch detection region as another detection target and multiple sensor electrodes located adjacent to the touch detection region as another detection target are included in the same another group.

In this case, when touch detection is performed simultaneously in two touch detection regions, the touch detection timing can be maintained, and degradation of touch detection sensitivity can also be restrained.

In the display system according to the one aspect of the present disclosure, for example, the drive circuit may supply the touch drive signal during a predetermined touch detection period, and stop supply of the touch drive signal during a period other than the predetermined touch detection period, when the supply of the touch drive signal is stopped, the touch detection circuit may detect noise at a frequency of the touch drive signal included in a detection signal received from a sensor electrode, and, when the touch detection circuit has detected noise, the drive circuit may supply, to the multiple sensor electrodes, a touch drive signal that has a frequency different from the frequency of the noise and that has a phase different for each group.

In this case, even when the touch detection circuit has detected noise, and the frequency of the touch drive signal is changed, radiation can be reduced.

A control device according to one aspect of the present disclosure is a control device that controls a display device including multiple sensor electrodes divided into multiple groups, and the control device includes:

a drive circuit that supplies, to the multiple sensor electrodes, a touch drive signal having a phase different for each group; and a touch detection circuit that performs detection of a touch by an object on the display device, based on a detection signal received from the multiple sensor electrodes.

According to this aspect, since the noise emitted from common electrodes in one group and the noise emitted from common electrodes in another group is added together in different phases, peak levels of radiation are lowered, compared to the case of supplying touch drive signals having the same phase. Therefore, radiation can be reduced.

A control method according to one aspect of the present disclosure is a control method used to control a display device including multiple sensor electrodes divided into multiple groups, and the control method includes:

supplying, to the multiple sensor electrodes, a touch drive signal having a phase different for each group; and performing detection of a touch by an object on the display device, based on a detection signal received from the multiple sensor electrodes.

According to this aspect, since the noise emitted from common electrodes in one group and the noise emitted from common electrodes in another group is added together in different phases, peak levels of radiation are lowered, compared to the case of supplying touch drive signals having the same phase. Therefore, radiation can be reduced.

A display system according to one aspect of the present disclosure includes:

a display device including multiple touch detection regions and multiple common electrodes among which multiple common electrodes are arranged in each of the touch detection regions;

a drive circuit that supplies a touch drive signal to the multiple common electrodes;

a touch detection circuit that performs, based on a signal received from multiple common electrodes in a touch detection region as a detection target, detection of a touch by an object on the touch detection region as a detection target; and a control circuit that controls the drive circuit, the control circuit provides control such that the amplitude of a touch drive signal supplied to at least one common electrode other than multiple common electrodes in the touch detection region as a detection target becomes smaller than the amplitude of a touch drive signal supplied to the multiple common electrodes in the touch detection region as a detection target.

According to this aspect, radiation caused by the touch drive signals can be reduced, and power consumption can also be reduced.

In the display system according to the one aspect of the present disclosure, for example, the control circuit may (1) provide control such that the amplitude of a touch drive signal supplied to a common electrode located adjacent to the touch detection region as a detection target becomes substantially identical with the amplitude of a touch drive signal supplied to multiple common electrodes in the touch detection region as a detection target, and (2) provide control such that the amplitude of a touch drive signal supplied to a common electrode other than the common electrodes located adjacent to the touch detection region as a detection target becomes smaller than the amplitude of a touch drive signal supplied to multiple common electrodes in the touch detection region as a detection target.

In this case, the touch detection timing in the touch detection region as a detection target can be maintained, compared to the case where all the common electrodes are driven by a touch drive signal in common.

A control method according to one aspect of the present disclosure is a control method used in a display system including:

a display device including multiple touch detection regions and multiple common electrodes among which multiple common electrodes are arranged in each of the touch detection regions;

a drive circuit that supplies a touch drive signal to the multiple common electrodes; and a touch detection circuit that performs, based on a signal received from multiple common electrodes in a touch detection region as a detection target, detection of a touch by an object on the touch detection region as a detection target, the control method includes providing control such that the amplitude of a touch drive signal supplied to multiple common electrodes in at least one touch detection region other than the touch detection region as a detection target becomes smaller than the amplitude of a touch drive signal supplied to multiple common electrodes in the touch detection region as a detection target.

According to this aspect, radiation caused by the touch drive signals can be reduced, and power consumption can also be reduced.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is a Continuation of International Application No. PCT/JP2020/006974, filed on Feb. 21, 2020, which in turn claims the benefit of Japanese Application No. 2019-053503, filed on Mar. 20, 2019 and Japanese Application No. 2019-053505, filed on Mar. 20, 2019, the disclosures of which Applications are incorporated by reference herein.

The invention claimed is:

1. A display system, comprising:
a display device comprising a plurality of sensor electrodes;
a drive circuit that supplies, to the plurality of sensor electrodes, a plurality of touch drive signals including a first touch drive signal and a second touch drive signal; and
a touch detection circuit that performs detection of a touch by an object on the display device, based on a detection signal received from the plurality of sensor electrodes,
wherein the display device includes a plurality of touch detection regions,
the plurality of sensor electrodes are arranged in each of the touch detection regions,
the plurality of touch detection regions includes a first touch detection region, a second touch detection region, and a third touch detection region located between the first touch detection region and the second touch detection region, during a first touch detection period, the drive circuit supplies the first touch drive signal to a plurality of sensor electrodes in the first touch detection region, and supplies the second touch drive signal to a plurality of sensor electrodes in the second touch detection region and the third touch detection region, during a second touch detection period, the drive circuit supplies the first touch drive signal to a plurality of sensor electrodes in the first touch detection region and the third touch detection region, and supplies the second touch drive signal to a plurality of sensor electrodes in the second touch detection region, and a phase of the first touch drive signal is different from a phase of the second touch drive signal.

2. The display system according to claim 1,
wherein the first touch drive signal is with a first phase and the second touch drive signal is with a second phase that is 180 degrees different from the first phase.

3. The display system according to claim 1,
wherein the plurality of sensor electrodes is divided into a plurality of groups;
the drive circuit supplies the plurality of touch drive signals having phases different for each group;
the sensor electrodes are common electrodes used for both image display and touch detection,
the touch detection circuit performs, based on a detection signal received from a sensor electrode in a touch detection region as a detection target among the plurality of touch detection regions, detection of a touch by an object on the touch detection region as the detection target, and
one of the plurality of groups includes a plurality of sensor electrodes in the touch detection region as the detection target.

4. The display system according to claim 3,
wherein the touch detection circuit serially changes the touch detection region as the detection target, and
the display system further comprises
a control circuit that changes a group division pattern such that a plurality of sensor electrodes in the touch detection region as the detection target and a plurality of sensor electrodes located adjacent to the touch detection region as the detection target are included in the same group.

5. The display system according to claim 3,
wherein, when the touch detection circuit performs detection of a touch by an object on the touch detection region as the detection target, the touch detection circuit also performs, based on a detection signal received from a plurality of sensor electrodes in a touch detection region as another detection target among the plurality of touch detection regions, detection of a touch by an object on the touch detection region as another detection target, and
a plurality of sensor electrodes in the touch detection region as another detection target is included in a group different from the group of a plurality of sensor electrodes in the touch detection region as the detection target.

6. The display system according to claim 5,
wherein the touch detection circuit serially changes the touch detection region as the detection target and the touch detection region as another detection target, and
the display system further comprises
a control circuit that changes a group division pattern such that a plurality of sensor electrodes in the touch detection region as the detection target and a plurality of sensor electrodes located adjacent to the touch detection region as the detection target are included in the same one group, and also such that a plurality of sensor electrodes in the touch detection region as another detection target and a plurality of sensor electrodes located adjacent to the touch detection region as another detection target are included in the same another group.

7. The display system according to claim 1,
wherein the drive circuit supplies the touch drive signal during a predetermined touch detection period, and stops supply of the touch drive signal during a period other than the predetermined touch detection period,
when the supply of the touch drive signal is stopped, the touch detection circuit detects noise at a frequency of the touch drive signal included in a detection signal received from a sensor electrode, and,
when the touch detection circuit has detected noise, the drive circuit supplies, to the plurality of sensor electrodes, a touch drive signal that has a frequency different from the frequency of the noise and that has a phase different for each group.

8. A control method used to control a display device comprising a plurality of sensor electrodes, the control method comprising:
supplying, to the plurality of sensor electrodes, a plurality of touch drive signals including a first touch drive signal and a second touch drive signal; and
performing detection of a touch by an object on the display device, based on a detection signal received from the plurality of sensor electrodes,
wherein the display device includes a plurality of touch detection regions,
the plurality of sensor electrodes is arranged in each of the touch detection regions,
the plurality of touch detection regions includes a first touch detection region, a second touch detection region, and a third touch detection region located between the first touch detection region and the second touch detection region,
during a first touch detection period, the drive circuit supplies the first touch drive signal to a plurality of sensor electrodes in the first touch detection region, and supplies the second touch drive signal to a plurality of sensor electrodes in the second touch detection region and the third touch detection region,
during a second touch detection period, the drive circuit supplies the first touch drive signal to a plurality of sensor electrodes in the first touch detection region and the third touch detection region, and supplies the second touch drive signal to a plurality of sensor electrodes in the second touch detection region, and
a phase of the first touch drive signal is different from a phase of the second touch drive signal.

9. The display system according to claim 1,
wherein the first touch drive signal and the second touch drive signal have substantially identical frequencies and substantially identical duty ratios.

10. The display system according to claim 1,
wherein the display displays an image in a plurality of display periods,
the touch detection circuit performs the detection of the touch in a plurality of touch detection periods,
the plurality of touch detection periods include the first touch detection period and the second touch detection period, and the plurality of display periods and the plurality of touch detection periods are alternately arranged.

11. The display system according to claim 1,
wherein the plurality of sensor electrodes are divided into two groups of a first group and a second group,
the first group includes the first touch detection region and the second group includes the second touch detection region,
during the first touch detection period, the third touch detection region is included in the first group, and
during the second touch detection period, the third touch detection region is included in the second group.

* * * * *